United States Patent [19]

Lee et al.

[11] Patent Number: 5,055,371
[45] Date of Patent: Oct. 8, 1991

[54] RECEIVER SHEET FOR TONER IMAGES

[75] Inventors: Jong S. Lee, Pittsford; Larry K. Maier, Rochester; Donald S. Rimai, Webster, all of N.Y.

[73] Assignee: Eastman Kodak Company, Rochester, N.Y.

[21] Appl. No.: 518,061

[22] Filed: May 2, 1990

[51] Int. Cl.⁵ .............................................. B32B 3/26
[52] U.S. Cl. ................................... 430/126; 156/229; 264/210.7; 428/315.5; 428/317.9; 428/319.7
[58] Field of Search ..................... 156/229; 264/210.7; 428/315.5, 315.7, 315.9, 317.9, 319.7; 430/126

[56] References Cited

U.S. PATENT DOCUMENTS

| 3,154,461 | 10/1964 | Johnson | 428/159 |
| 3,944,699 | 3/1976 | Mathews et al. | 428/220 |
| 4,377,616 | 3/1983 | Ashcraft et al. | 428/317.9 |
| 4,770,931 | 9/1988 | Pollock et al. | 428/317.9 |
| 4,927,727 | 5/1990 | Rimai et al. | 430/99 |

Primary Examiner—William J. Van Balen
Attorney, Agent, or Firm—Willard G. Montgomery

[57] ABSTRACT

A microvoided polymeric receiver sheet provides important advantages in the transfer of electrophotographic toner images. Especially advantageous in reducing image defects is the use of such receiver sheets for thermally assisted transfer of toners of small particle size.

19 Claims, 1 Drawing Sheet

RECEIVER SHEET FOR TONER IMAGES

FIELD OF THE INVENTION

This invention relates to receiver sheets for electrostatographic imaging processes such as electrophotography. More particularly, it relates to a novel receiver sheet for toner images, also to a method of transferring a toner image to a receiver sheet, and to the method of forming such a receiver sheet.

BACKGROUND

In a conventional electrostatographic copying process, a latent electrostatic image is formed on the insulating surface of an element such as a photoconductor. If a dry development process is used, charged toner particles are applied to the electrostatic image, where they adhere in proportion to the electrostatic potential difference between the toner particles and the charges on the latent image. Toner particles that form the developed image are then transferred to a receiver to which the transferred image is fixed, usually by thermal fusion. It is conventional to transfer toner particles from the image bearing element to the receiver by means of an electrostatic bias between the receiver and the element.

While the conventional electrostatic transfer process works well with large toner particles, difficulties arise as the size of the toner particles is reduced. Smaller toner particles are necessary for images of high resolution and low granularity. As the particle size of the toner falls below about 8 micrometers, however, the surface forces holding the toner particles to the element tend to dominate over the electrostatic force that can be applied to the particles to assist their transfer to the receiver. Thus, less toner transfers and image quality suffers. In addition, as the particle size decreases, Coulombic repulsion between the particles tends to scatter the particles, causing loss in image resolution and increase in graininess and mottle. Thus, high resolution images require very small particles, but high resolution images without image defects have not been achievable using electrostatic transfer.

An important advance in the non-electrostatic transfer of toner particles to a receiver surface has been described in the copending U.S. patent application of Rimai et al, Ser. No. 230,394, filed Aug. 9, 1988, now U.S. Pat. No. 4,927,727. The described procedure, which is called thermally assisted transfer, is especially advantageous for toner powders of small particle size, e.g., below about 8 micrometers.

In the thermally assisted transfer process, the receiver, which can be a sheet of paper, is heated, and is pressed against the toner particles on the element. The heated receiver sinters the thermoplastic toner particles, causing them to stick to each other and to the receiver. The element and receiver are then separated and the toner image is fixed, e.g., by ferrotyping to the receiver. For details, see copending application of Rimai et al, Ser. No. 230,394, entitled "Thermally Assisted Transfer of Small Electrostatographic Toner Particles", filed Aug. 9, 1988, which is incorporated herein by reference.

To aid in transferring all of the toner particles from the element to the receiver, it is advantageous to coat the receiving surface of the receiver with a thermoplastic polymer. During transfer the toner particles adhere to or become partially embedded in the thermoplastic coating and are thereby more completely removed from the element. A further improvement in the procedure is to coat the thermoplastic polymer layer on the receiver with a release agent such as zinc stearate. These improvements and preferred materials for the thermoplastic layer and the release agent are disclosed in more detail in the copending application of Rimai et al, Ser. No. 345,160, entitled "Method of Non-Electrostatically Transferring Toner", filed Apr. 28, 1989, now U.S. Pat. No. 4,968,578, and incorporated herein by reference.

While a release agent can advantageously be coated on the thermoplastic layer of the receiver sheet, other techniques can also be used to improve the transfer efficiency. For example, when the binder resin for the photoconductor and the thermoplastic polymer layer of the receiver are appropriately selected with respect to their compositions and surface energies, a release agent is not necessary. Examples of preferred materials are disclosed in copending application of Light et al, Ser. No. 455,673, entitled "Thermally Assisted Transfer of Electrostatographic Toner Particles to a Thermoplastic Bearing Receiver", filed Dec. 22, 1989, which is incorporated herein by reference.

Even with the new thermally assisted transfer process disclosed in the cited copending applications, certain problems relating to the conventionally available receiver sheets are encountered.

Receiver sheets for electrophotographic toner images mainly have been paper although plastic sheets have also been used. Both have disadvantages, especially for receiving, fusible toner powder of small particle size in the making of continuous tone or half-tone electrophotographic reflective prints. To use a plastic sheet for this purpose the plastic must be pigmented, e.g., with titanium dioxide or the like in order to provide an opaque, reflective support for the toner image. Blending a colorant with the polymer adds cost and the pigmented sheet has a higher specific gravity. Furthermore, colorants tend to fade or otherwise change color with aging.

As for paper, its surface is too rough for high resolution of images. The paper must, therefore, have a smooth surface layer of plastic or clay. This, of course, adds cost. A particularly serious disadvantage is that, being fibrous and hydrophilic, paper unavoidably contains moisture. When heated, as in the thermally assisted transfer of toner powder to the receiver sheet and in fusing toner to the receiver sheet, the moisture in the paper vaporizes and causes the paper to buckle and blister in the toned image, especially in large areas of toner.

A need has existed, therefore, for an improved receiver sheet, especially for thermally assisted transfer, but also for other transfer techniques such as electrostatic, when the image has large solid areas of toner. The receiver should have several important properties. First, it should be suitable for the fusion and fixing thereto of toner powders of small particle size to provide images of high resolution. The sheet must retain dimensional stability when heated during the transfer and fixing of toner to it. The sheet must be low in moisture content in order to avoid problems caused by water vaporization during heating. In addition, for receiver sheets having a thermoplastic surface layer there must be good adhesion between the thermoplastic surface layer and the substrate of the sheet in order to avoid delamination when heated. Then, of course, as a support for electrophotographic prints, the sheet must be substantially opaque and highly reflective for visible light.

For convenience in handling, the sheet should be flexible and of reasonably low specific gravity. It should also have low manufacturing cost.

The present invention offers further improvement in the forming of images of high resolution by thermally assisted transfer of small particle toners. It provides this improvement by the use of a type of receiver sheet which has not heretofore, been used for toner images. It also provides an improvement regardless of the method of image transfer when the toner images have large solid areas of toner. Images of this kind include continuous tone electrophotographic prints and also half-tone images, particularly when dot spread occurs and creates large solid toner areas, as well as largely alpha-numeric images that in addition have solid areas such as graphics and corporate logos.

A problem with all such images is that the toner in the large solid areas will crack and the paper will deform when paper is the receiver sheet. The reason is that paper absorbs moisture and when the paper dries out it shrinks while the large toner areas do not. The dimensional changes of the paper relative to the toner areas will create an unsightly appearance in the graphics or logos or will damage any continuous tone or half tone images having large toner areas. The paper may also curl or wrinkle. Ordinary plastic sheets, although not moisture-absorbent, also have drawbacks mentioned previously.

The receiver sheet of the present invention provides unexpected advantages over previously used receiver materials for toner images of the types mentioned.

BRIEF SUMMARY OF THE INVENTION

The receiver sheet of the invention comprises (a) a non-fibrous but paper-like, microvoided sheet which is substantially opaque and highly reflective to visible light and which comprises a continuous matrix of oriented and heat-set thermoplastic polymer having dispersed therein microbeads of polymer surrounded by void spaces, and (b) bonded to at least one surface of sheet (a) a smooth layer of thermoplastic polymer having a glass transition temperature below the melting temperature of the polymer matrix of sheet (a) and, preferably, below about 80° C.

The method of the invention by means of which the novel receiver sheet is prepared comprises forming a blend of a major amount of a molten thermoplastic matrix polymer and of a minor amount of microbeads of a polymer which is incompatible with the matrix polymer and of higher glass transition temperature, coextruding the blend of molten matrix polymer and microbeads with a molten homogenous polymer of lower glass transition temperature than the matrix polymer, recovering a coextruded laminated sheet comprising a layer of the matrix polymer and uniformly dispersed microbeads bonded to a layer of the homogeneous polymer, and orienting the laminated sheet to create in the matrix polymer layer light-scattering voids surrounding each microbead and heat setting the oriented sheet, the resulting laminated sheet having a smooth surface of low glass transition temperature for receiving toner particles and, by virtue of the voids in the matrix polymer, being substantially opaque and highly light reflective.

The invention also provides a method of forming on a light-reflecting receiver sheet a developed toner image having large, substantially continuous areas of toner which comprises forming a latent electrostatic image on an element, developing the image by applying dry thermoplastic toner particles to the latent image on the element, transferring the toner particles of the developed image, including large continuous areas of toner, to a receiver sheet by contacting the sheet with the element, and fusing and fixing the toner particles to the receiver sheet by pressing the transferred toner on the receiver sheet at a temperature above about 110° C., said receiver sheet comprising a non-fibrous but paper-like, microvoided polymeric sheet which is substantially opaque and is highly reflective to visible light and which comprises a continuous matrix of oriented thermoplastic polymer having dispersed therein microbeads of a different polymer each of which is surrounded by a void space.

DETAILED DESCRIPTION OF THE INVENTION

The term "microvoided polymeric sheet" as used herein refers to a paper-like, opaque and light-reflective polymeric sheet material in the form of a sheet or web and comprising an oriented polymer matrix or continuous phase having microbeads uniformly dispersed therein, which are incompatible with the matrix polymer, each of such microbeads being at the center of a microvoid or cavity in the matrix polymer. The microvoids result when the blend of matrix polymer and microbeads is extruded as a film or web and then stretched or oriented. Upon orientation, most preferably biaxial orientation, the film becomes white and opaque as a result of light being scattered from the walls of the microvoids. Further details of the characteristics of and the procedure for making microvoided polymeric sheets are disclosed in patents and pending U.S. patent applications, including U.S. Pat. Nos. 3,154,461; 3,944,699; 4,377,616; 4,770,931; and copending application of Maier et al, Ser. No. 457,894, filed Dec. 27, 1989, now U.S. Pat. No. 4,994,312 and entitled "Shaped Articles from Orientable Polymers and Polymer Microbeads". These and the other references cited herein are incorporated herein by reference.

All of the microvoided polymeric sheet materials described in the above-incorporated references are useful as toner receivers in accordance with the present invention. Highly preferred, however, is the type of sheet described in the cited application of Maier et al, Ser. No. 457,894, wherein the matrix polymer, preferably a polyester has dispersed therein microbeads of a cross-linked polymer coated with a slip agent.

The patent to Pollock et al, U.S. Pat. No. 4,770,931, incorporated by reference, describes another preferred type of microvoided sheet. In this type of sheet the microbeads are cellulose acetate.

The microbeads dispersed in the matrix polymer have a size of about 2 to 30 micrometers, preferably about 5 to 20 micrometers, and are present in an amount of about 5% to about 50% by weight based on the weight of continuous phase polymer. The voids created by the microbeads occupy up to about 60% by volume of the support, preferably from about 30% to about 50% by volume. Larger beads generate a greater amount of void space upon stretching of the sheet, but result in a rough surface. Smaller beads result in a smoother surface, but less void volume. To obtain a sheet with both a high void volume and a smooth surface, a dual layer sheet can be made. The bulk of the sheet comprises a layer made with relatively large beads to generate a large void volume, and this layer is coated with a smoothing layer containing small beads or no beads at all.

The receiver sheets according to this invention, without additives or colorants, are white, opaque and resistant to wear, moisture, oil, tearing, etc. They preferably have a thickness of about 50–250 μm. Preferably, the sheet is made by biaxial orientation using procedures well known in the art.

The continuous phase matrix polymer can be any film-forming polymer such as a polyester capable of being cast or extruded into a film or sheet. The polyesters should have a glass transition temperature between about 50° C. and about 150° C., preferably about 60°–100° C., should be orientable, and have an I.V. of at least 0.50, preferably 0.6 to 0.9. Suitable polyesters include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well-known techniques, e.g., those described in U.S. Pat. Nos. 2,465,319 and 2,901,466. Preferred continuous matrix polymers are those having repeat units from terephthalic acid or naphthalene dicarboxylic acid and at least one glycol selected from ethylene glycol, 1,4-butanediol and 1,4-cyclohexanedimethanol. Poly(ethylene terephthalate), which may be modified by small amounts of other monomers, is especially preferred. Polypropylene is also useful.

In the preferred microvoided sheets, as mentioned above, the microbeads are formed of a cross-linked polymer and are coated with a slip agent.

Preferred cross-linked polymers for the microbeads are various well-known addition and condensation polymers and copolymers, including acrylics and polyesters, which are crosslinked with a crosslinking agent such as divinylbenzene, diethylene glycol dimethacrylate, diallyl fumarate, diallyl phthalate or mixtures thereof.

Examples of specific monomers for the cross-linked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acyclic acid, divinylbenzene, arylamidomethylpropane sulfonic acid, vinyl toluene, etc. Preferably, the cross-linked polymer is polystyrene or poly(methyl methacrylate). Most preferably, it is polystyrene and the crosslinking agent is divinylbenzene.

Processes well known in the art yield non-uniformly sized microbeads having broad particle size distributions. The beads can be classified by screening to narrow the range of sizes. Other processes such as suspension polymerization and limited coalescence, directly yield more uniformly sized particles.

Suitable slip agents or lubricants include colloidal silica, colloidal alumina, and metal oxides such as tin oxide and aluminum oxide. The preferred slip agents are colloidal silica and alumina, most preferably, silica. The cross-linked polymer having a coating of slip agent may be prepared by procedures well known in the art. For example, conventional suspension polymerization processes wherein the slip agent is added to the suspension is preferred. As the slip agent, colloidal silica is preferred.

It is preferred to use the "limited coalescence" technique for producing the coated, cross-linked polymer microbeads. This process is described in detail in U.S. Pat. No. 3,615,972, incorporated herein by reference. Preparation of the coated microbeads for use in the present invention does not utilize a blowing agent as described in this patent, however.

Following is an example of a procedure for preparing the cross-linked polymeric microbeads coated with slip agent. The polymer is polystyrene cross-linked with divinylbenzene. The microbeads have a coating of silica. The microbeads are prepared by a procedure in which monomer droplets containing an initiator are sized and heated to give solid polymer spheres of the same size as the monomer droplets. A water phase is prepared by combining 7 liters of distilled water, 1.5 grams potassium dichromate (polymerization inhibitor for the aqueous phase), 250 grams polymethylaminoethanol adipate (promoter), and 350 grams LUDOX (a colloidal suspension containing 50% silica sold by DuPont). A monomer phase is prepared by combining 3317 grams styrene, 1421 grams divinyl benzene (55% active crosslinking agent; other 45% is ethyl vinyl benzene which forms part of the styrene polymer chain) and 45 grams VAZO 52 (a monomer-soluble initiator sold by DuPont). The mixture is passed through a homogenizer to obtain 5 micron droplets. The suspension is heated overnight at 52° C. to give 4.3 kg of generally spherical microbeads having an average diameter of about 5 microns with narrow size distribution (about 2–10 microns size distribution). The mol proportion of styrene and ethyl vinyl benzene to divinylbenzene is about 6.1%. The concentration of divinylbenzene can be adjusted up or down to result in about 2.5–50% (preferably 10–40%) crosslinking by the active cross-linker.

Of course, monomers other than styrene and divinylbenzene can be used in similar suspension polymerization processes known in the art. Also, other initiators and promoters may be used as known in the art. Slip agents other than silica may also be used. For example, a number of LUDOX colloidal silicas are available from DuPont. LEPANDIN colloidal alumina is available from Degussa. NALCOAG colloidal silicas, tin oxide and titanium oxide are available from Nalco. Normally, for the polymer to have suitable physical properties such as resiliency, the polymer is crosslinked.

By percent cross-linked, is meant the mol % of cross-linking agent based on the amount of primary monomer. Such limited crosslinking produces microbeads which are sufficiently coherent to remain intact during orientation of the continuous polymer. Beads of such cross-linking are also resilient, so that when they are deformed (flattened) during orientation by pressure from the matrix polymer on opposite sides of the microbeads, they subsequently resume their normal spherical shape to produce the largest possible voids around the microbeads to thereby produce sheets with less density.

Microbead size is regulated by the ratio of silica to monomer. For example, the following ratios produce the indicated size microbead:

| Microbead Size, Microns | Monomer, Parts by Wt. | Slip Agent (Silica) Parts by Wt. |
| --- | --- | --- |
| 2 | 10.4 | 1 |
| 5 | 27.0 | 1 |
| 20 | 42.4 | 1 |

The cross-linked polymer may be in the form of solid or semi-solid microbeads. Because of the incompatibility between the matrix polymer and cross-linked polymer, there is no attraction or adhesion between them, and they become uniformly dispersed in the matrix polymer upon mixing.

After mixing the matrix polymer and microbeads, the blend is melt extruded and quenched in known manner to form a film. The film is oriented by stretching and is then heat set or annealed to maintain dimensional stability as a receiver sheet when heated during the transfer and fusion of toner to the sheet.

Methods of unilaterally or bilaterally orienting sheet or film material are well known in the art. Such methods comprise stretching the sheet or film at least in the machine or longitudinal direction after it is cast or extruded an amount of about 1.5–10 times its original dimension. The sheet or film may also be stretched in the transverse or cross-machine direction by apparatus and methods well known in the art, in amounts of generally 1.5–10 (usually 3–4 for polyesters and 6–10 for polypropylene) times the original dimension. Such apparatus and methods are well known in the art and are described in such U.S. Pat. No. 3,903,234, incorporated herein by reference.

The voids, or void spaces surrounding the microbeads are formed as the continuous matrix polymer is stretched at a temperature above the Tg of the matrix polymer. The microbeads of cross-linked polymer are relatively hard compared to the continuous matrix polymer. Also, because of the incompatibility and immiscibility between the microbead and the matrix polymer, the continuous matrix polymer slides over the microbeads as it is stretched, causing voids to be formed at the sides in the direction or directions of stretch, which voids elongate as the matrix polymer continues to be stretched. Thus, the final size and shape of the voids depends on the direction(s) and amount of stretching. If stretching is only in one direction, microvoids will form at the sides of the microbeads in the direction of stretching. If stretching is in two directions (bidirectional stretching), in effect such stretching has vector components extending radially from any given position to result in a doughnut-shaped void surrounding each microbead.

Following the orientation or stretching of the sheet or film, it is heat set in known manner under conditions of time, temperature and tension suitable for providing dimensional stability.

To prepare the receiver sheets for use in the image-transfer method of the invention different procedures can be used. In the simplest embodiment, the receiver sheet consists essentially of the microvoided polymeric sheet, prepared as described above by extruding a blend of matrix polymer and microbeads and then orienting the resulting film to create a microvoided, opaque, light-reflective sheet material.

The receiver sheet having a homogeneous thermoplastic layer, as described herein, is a new article of manufacture. It comprises as a substrate, the microvoided polymeric sheet, and as a receiving layer, a coating or layer of thermoplastic polymer, which preferably is transparent but can be colored, as will be described in more detail.

The thermoplastic layer of the microvoided sheet can be formed on the microvoided sheet in more than one way. An important advantage of the microvoidable polymer blend, however, is that it can be coextruded with the thermoplastic layer. A suitable method of coextrusion is the well-known "feed block adapter" method developed by Dow, by means of which two polymer streams can be coextruded to form a two-layer film. See U.S. Pat. Nos. 3,479,425 and 3,557,265. Useful techniques are also disclosed in U.S. Pat. Nos. 4,291,092 and 4,297,411. All of these patents are incorporated herein by reference.

Following the coextrusion, the two-layer or laminated film is oriented, preferably biaxially, to create microvoids in the microvoidable layer. The resulting oriented film has the desired properties of opacity and light-reflectivity and has a thin receiving layer of homogeneous thermoplastic polymer.

While the coextrusion method offers valuable economies, the microvoided sheet can be extruded and oriented first. Then the thermoplastic layer is formed on it in a known manner by solvent coating or melt extrusion coating. Another possibility is to coat the thermoplastic layer on the extruded film and the orient the coated film. An advantage of this and of the coextrusion technique is that a very thin thermoplastic layer can be obtained, i.e., 0.5 mil or less, without the difficulty of coating such a thin layer uniformly, inasmuch as the coated layer becomes much thinner when stretched.

Figure 1:
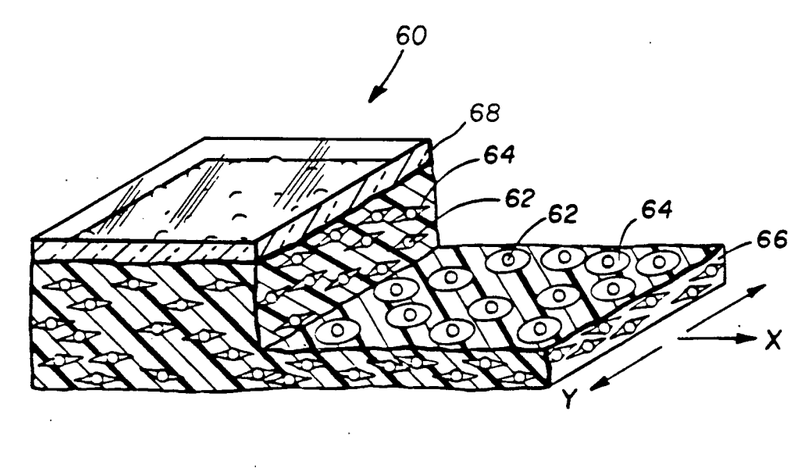
The sole figure is a diagrammatic view, partially in section, of a receiver sheet of the invention which is biaxially oriented in the machine direction, X, and the transverse direction, Y.

The drawing illustrates a receiver sheet 60 of the invention, which has been biaxially oriented in both the machine direction, X, and the transverse direction, Y, as indicated by the arrows and then heat set or annealed. Microbeads 62 are contained within generally circular microvoids 64 in the matrix polymer 66, thus forming a substrate for sheet 60. Microvoids 64 surrounding microbeads 62 are theoretically regular in shape but microscopic examination may show irregularities, particularly when the random spacing of the microbeads results in two or more microbeads being in close proximity. Coated or coextruded over the matrix polymer of the substrate of sheet 60, and thus bonded to its surface, is a transparent thermoplastic layer 68 of lower Tg than the matrix polymer. It will be noted that beneath layer 68 the surface of the substrate is textured or somewhat rough because the microbeads near the surface tend to be incompressible and form projections without rupturing the surface. This is a known characteristic of microvoided sheets which provides a matte surface. In the receiver sheet of the invention, as shown in the drawing, the thermoplastic layer 68 covers the matte surface of the substrate layer and provides a smooth toner receiving surface for sheet 60.

The homogeneous thermoplastic polymer which is coated on or coextruded with the substrate polymer should have certain characteristics. These include a molecular weight in the range from about 20,000 to about 500,000; a glass transition temperature in the range from about 40 to about 80° C.; and a surface energy in the range from about 40 to about 60 dynes per centimeter. A polymer having these properties softens at the relatively low temperatures employed in a thermally assisted contact transfer process for fusible toner powder. It should be understood, however, that the receiver sheets of the present invention, because they do not absorb moisture and therefore do not cause blistering can be used at higher transfer temperatures than other receiver sheets. This can provide greater toner transfer efficiency.

Various film forming thermoplastic polymers and blends thereof having the described characteristics can be used as the thermoplastic surface polymer layer for the receiver sheet in accordance with the invention. Examples include polyesters; polystyrene; copolymers of styrene and acrylic monomers; polymethyl methacrylate; polyvinyl acetate; polyolefins, and olefin copolymers, such as polyvinylethylene-co-acetate, polyethylene-co-acrylics, amorphous polypropylene, and copolymers and graft copolymers of polypropylene; and the like.

Cellulosic polymers, such as cellulose acetate, or cellulose butyrate, can be used, as can extrudable so-called engineering resins, such as polyimides, and the like.

One presently preferred class of thermoplastic coating polymers comprises copolymers of styrene and a lower alkylacrylate, such as poly(styrene-co-butylacrylate). Another preferred class of polymers comprises copolymers of a lower alkylene terephthalate and dioxyethylene, such as poly(2,2-dioxyethylene-co-ethylene terephthalate). The term "lower" as used herein means that the referenced group contains less than 7 carbon atoms therein. These preferred classes of polymers for the thermoplastic layer result in receivers having outstanding performance characteristics in the thermally assisted transfer process.

Another presently preferred class of thermoplastic polymers comprises polymers with characteristics as above indicated and which have a substantially non-tacky surface when in a glassy state. Examples of such polymers include various styrene butylacrylates such as Pliotone 2003 polymer and Pliotone 2015 polymer, both available from Goodyear. Especially useful are blends of such polymers with a low molecular weight polymer, such as α-methylstyrene-vinyltoluene copolymer, having a weight average molecular weight less than 10,000.

Following the formation of the laminated web by coextrusion, as disclosed above, the web is cut into desired sheet sizes to form toner receiver sheets. These sheets are especially adapted for use in the thermally assisted transfer method of transferring a thermoplastic toner of small particle size to a receiver.

In general, the method of the invention for forming an electrostatic toner image on a light-reflecting receiver sheet involves first forming a latent electrostatic image on an element. Most commonly, this will consist of an electrostatic image pattern on a photoconductive surface in known manner as, for example, in an electrophotographic copying machine.

In the same machine the latent image is developed by applying a thermoplastic toner powder to the photoconductor or other substrate, preferably using a magnetic brush developing means although other means can be used. Thereafter, the developed toner image is transferred to and fixed to the receiver sheet. Although the method of transfer can be non-electrostatic or electrostatic, the use of microvoided receiver sheets in accordance with the invention is especially advantageous in non-electrostatic, thermally assisted transfer. Hence, the invention will be described in more detail with regard to this time of transfer. A large body of prior art is available as to electrostatic transfer techniques with other kinds of receivers.

In the discussion which follows of electrophotographic toners, toner transfer and image development, and especially of thermally assisted transfer, the following definitions of terms will be of interest.

The term "particle size", or the term "size", or "sized" in reference to the term "particles", means the mean volume weighted diameter as measured by conventional diameter measuring devices, such as a Coulter Multisizer, sold by Coulter, Inc. Mean volume weighted diameter is the sum of the mass of each particle times the diameter of a spherical particle of equal mass and density, divided by total particle mass.

The term "glass transition temperature" or "Tg" means the temperature at which an amorphous polymer changes from a solid state to a liquid state. This temperature (Tg) can be measured by differential thermal analysis as disclosed in N. F. Mott and E. A. Davis, "Electronic Processes in Non-Crystalline Materials", Oxford Press (1971).

The term "melting temperature" or "Tm" means the temperature at which a crystalline polymer changes from a solid state to a liquid state. This temperature (Tm) can be measured by differential thermal analysis as disclosed in "Electronic Processes in Non-Crystalline Materials".

The term "surface tension" or "surface energy" means the energy needed to create a unit area of surface from the bulk. It can be measured by measuring the contact angle of two liquids such as water and diiodomethane and adding the polar and dispersive contributions as disclosed in "Physical Chemistry of Surfaces", 4th Ed., Adamson (1982).

The term "element" as used herein refers to electrostatographic elements, including photoconductor elements, graphic elements, dielectric recording elements, and like electrographic elements on which electrostatic latent images can be formed. Examples of such elements can be found in, for instance, U.S. Pat. Nos. 4,175,960 and 3,615,414.

The term "locations of contact" as used herein in relation to toner particles employed in the practice of this invention and to surfaces contacted thereby refers to localized regions on individual toner particle surfaces which are in contact either with one another, or with the surface upon which such a particle is deposited.

The term "sinters" or "sintering" as used herein in relation to toner particles employed in the practice of this invention refers to bonding or fusion that is thermally achieved at locations of contact existing either between adjacent toner particles or between toner particles and an adjacent surface. The term "sinter" and equivalent forms is distinguished for present purposes from a term such as "melts", "melting", "melt", "melt fusion" or "heat fusion". In heat fusion, in response to sufficient applied thermal energy, toner particles tend to lose their discrete individual identities to melt, and to blend together into a localized mass, as when a toner powder is heat fused and thereby bonded or fixed to a receiver.

The term "large continuous areas of toner" means areas of a developed image pattern in which the width of a toned area is sufficient that bending or curling of the receiver sheet causes visible cracking of the image pattern in such an area. Such large areas are especially present in continuous tone images wherein the image area on the receiver is covered with toner. They also occur in half-tone images when dot spread occurs and the toner dots flow together to form a continuous mass of large area. Even in alpha-numeric copies such large areas can be present in the solid areas of logos and graphics.

For electrostatic transfer, the dry thermoplastic toner can range in particle size from above 8 micrometers up to about 100 micrometers. However, for thermally assisted transfer the toners have a preferred particle size of less than 8 micrometers, and most preferably less than 5 micrometers. The toners must contain a thermoplastic binder in order to be fusible. The toner binder should have a glass transition temperature, Tg, of about 40° to about 100° C., and preferably about 45° to about 65° C., as a lower Tg may result in a clumping of the toner as it is handled at room temperature, while a higher Tg renders the process of this invention too energy intensive and may heat the substrate too much, resulting in damage to the substrate and various transfer problems. Preferably, the toner particles have a relatively high caking temperature, for example, higher than about 60° C., so that the toner powders can be stored for relatively long periods of time at fairly high temperatures without individual particles agglomerating and clumping together.

The melting point of polymers useful as toner binders preferably is about 65° C. to about 200° C. so that the toner particles can be readily fused to a receiver to form a permanent image. Especially preferred polymers are those having a melting point of about 65° to about 120° C. The polymers useful as toner binders in the practice of the present invention can be used alone or in combination and include those polymers conventionally employed in electrostatic toners. Among the various polymers which can be employed in the toner particles of the present invention are polycarbonates, resin-modified maleic alkyd polymers, polyamides, phenol-formaldehyde polymers and various derivatives thereof, polyester condensates, modified alkyd polymers, aromatic polymers containing alternating methylene and aromatic units such as described in U.S. Pat. No. 3,809,554 and fusible crosslinked polymers as described in U.S. Pat. No. Re 31,072.

Typical useful toner polymers include certain polycarbonates such as those described in U.S. Pat. No. 3,694,359, which include polycarbonate materials containing an alkylidene diarylene moiety in a recurring unit and having from 1 to about 10 carbon atoms in the alkyl moiety. Other useful polymers having the above-described physical properties include polymeric esters of acrylic and methacrylic acid such as poly(alkyl acrylate), and poly(alkyl methacrylate) wherein the alkyl moiety can contain from 1 to about 10 carbon atoms. Additionally, other polyesters having the aforementioned physical properties are also useful. Among such other useful polyesters are copolyesters prepared from terephthalic acid (including substituted terephthalic acid), a bis(hydroxyalkoxy)phenylalkane having from 1 to 4 carbon atoms in the alkoxy radical and from 1 to 10 carbon atoms in the alkane moiety (which can also be a halogen-substituted alkane), and an alkylene glycol having from 1 to 4 carbon atoms in the alkylene moiety.

Other useful polymers are various styrene-containing polymers. Such polymers can comprise, e.g., a polymerized blend of from about 40 to about 100 percent by weight of styrene, from 0 to about 45 percent by weight of a lower alkyl acrylate or methacrylate having from 1 to about 4 carbon atoms in the alkyl moiety such as methyl, ethyl, isopropyl, butyl, etc. and from about 5 to about 50 percent by weight of another vinyl monomer other than styrene, for example, a higher alkyl acrylate or methacrylate having from about 6 to 20 or more carbon atoms in the alkyl group. Typical styrene-containing polymers prepared from a copolymerized blend as described hereinabove are copolymers prepared from a monomeric blend of 40 to 60 percent by weight styrene or styrene homolog, from about 20 to about 50 percent by weight of a lower alkyl acrylate or methacrylate and from about 5 to about 30 percent by weight of a higher alkyl acrylate or methacrylate such as ethylhexyl acrylate (e.g., styrene-butyl acrylate-ethylhexyl acrylate copolymer). Preferred fusible styrene copolymers are those which are covalently crosslinked with a small amount of a divinyl compound such as divinylbenzene. A variety of other useful styrene-containing toner materials are disclosed in U.S. Pat. Nos. 2,917,460; Re 25,316; 2,788,288; 2,638,416; 2,618,552 and 2,659,670. Preferred toner binders are polymers and copolymers of styrene or a derivative of styrene and an acrylate, preferably butylacrylate.

Useful toner particles can simply comprise the polymeric particles but it is often desirable to incorporate addenda such as waxes, colorants, release agents, charge control agents, and other toner addenda well known in the art. The toner particle can also incorporate carrier material so as to form what is sometimes referred to as a "single component developer." The toners can also contain magnetizable material, but such toners are not preferred because they are available in only a few colors and it is difficult to make such toners in the small particles sizes required in this invention.

If a colorless image is desired, it is not necessary to add colorant to the toner particles. However, more usually a visibly colored image is desired and suitable colorants selected from a wide variety of dyes and pigments such as disclosed for example, in U.S. Pat. No. Re. 31,072 are used. A particularly useful colorant for toners to be used in black-and-white electrophotographic copying machines is carbon black. Colorants in the amount of about 1 to about 30 percent, by weight, based on the weight of the toner can be used. Often about 8 to 16 percent, by weight, of colorant is employed.

Charge control agents suitable for use in toners are disclosed for example in U.S. Pat. Nos. 3,893,935; 4,079,014; 4,323,634 and British Patent Nos. 1,501,065 and 1,420,839. Charge control agents are generally employed in small quantities such as about 0.1 to about 3, weight percent, often 0.2 to 1.5 weight percent, based on the weight of the toner.

Toners used in this invention can be mixed with a carrier vehicle. The carrier vehicles, which can be used to form suitable developer compositions, can be selected from a variety of materials. Such materials include carrier core particles and core particles overcoated with a thin layer of film-forming resin. Examples of suitable resins are described in U.S. Pat. Nos. 3,547,822; 3,632,512; 3,795,618; 3,898,170; 4,545,060; 4,478,925; 4,076,857; and 3,970,571.

The carrier core particles can comprise conductive, non-conductive, magnetic, or non-magnetic materials. See, for example, U.S. Pat. Nos. 3,850,663 and 3,970,571. Especially useful in magnetic brush development schemes are iron particles such as porous iron particles having oxidized surfaces, steel particles, and other "hard" or "soft" ferromagnetic materials such as gamma ferric oxides or ferrites, such as ferrites of barium, strontium, lead, magnesium, or aluminum. See for example, U.S. Pat. Nos. 4,042,518; 4,478,925; and 4,546,060.

The very small toner particles that are used in thermally assisted transfer can be prepared by a variety of processes well-known to those skilled in the art including spray-drying, grinding, and suspension polymerization.

The image-bearing element can be in the form of a drum, a belt, a sheet, or other shape, and can be made of any of the conventional materials used for such purposes. While dielectric recording materials can be used, photoconductive materials are preferred, and organic photoconductive materials are preferred over inorganic photoconductive materials, because they produce an image of superior quality. While the image-bearing element can be a single use material, reusable elements are preferred as they are less expensive. Of course, reusable elements must be thermally stable at the temperature of transfer. The surface properties of the element and the receiver should be adjusted so that at the operating temperature of the transfer the toner adhesion to the element is less than the toner adhesion to the receiver. This can be accomplished by using substrates having low surface energy, such as polytetrafluoroethylene coated polyesters, or by incorporating low surface adhesion (LSA) materials, such as zinc stearate, into or coating the element with an LSA material.

In order to insure that the toner adhesion to the receiver is greater than the toner adhesion to the element at the temperature of transfer, the properties of the receiver surface can also be selected so as to increase the adhesion of the toner particles to that surface. This can most advantageously be accomplished by coating the receiver with a thermoplastic that will not stick to the photoconductor, or by coating the receiver with a thermoplastic polymer over which is coated a release agent which preferably has a lower surface energy than said substrate, as is described in copending application Ser. No. 230,381, titled "Improved Method Of Non-Electrostatically Transferring Toner, "filed Aug. 9, 1988, now abandoned herein incorporated by reference. If a receiver is coated with a thermoplastic polymer, it is important that the Tg of the thermoplastic polymer be less than 10° C. above the Tg of the toner binder and that the receiver be heated to a temperature above the Tg of the thermoplastic polymer, so that the thermoplastic coating softens and the toner particles become embedded therein.

In the method of this invention, the receiver is preheated to a temperature such that the temperature of the receiver during transfer will be adequate to fuse the toner particles at their points of contact but will not be high enough to melt the toner particles, or to cause contacting particles to coalesce or flow together into a single mass. The temperature range necessary to achieve that result depends upon the time that a receiver resides in the nip and the heat capacity of the receiver. In most cases the result can be achieved if the temperature of the receiver immediately after the receiver contacts the substrate is below the Tg of the toner binder but above a temperature that is 20 degrees below that Tg. However, receiver temperatures up to 10° C. above the Tg of the toner binder are tolerable when nip time is small or the heat capacity of the receiver is low. Although either side of the receiver can be heated, it is preferable to heat only the front surface of the receiver, that is, the surface of the receiver that will contact the toner particles, as this is more energy efficient, it is easier to control the temperature of that surface when the heat does not have to pass through the receiver, and it usually avoids damage to the receiver. Such heating can be accomplished by any suitable means, such as radiant heat in an oven or contacting the receiver with a heated roller or a hot shoe.

The preheating of the receiver must be accomplished before the heated portion of the receiver contacts the element because, if the receiver is heated only in the nip, its temperature may fluctuate over a wide range and its temperature cannot easily be kept within the desired range. Thus, if the backup roller, which presses the receiver against the element, is used to heat the receiver, the receiver must be wrapped around the backup roller sufficiently so that the receiver is heated to the proper temperature before it enters the nip. The backup roller is preferably not the sole source of heat used to effect the transfer, however, because the backup roller heats the back of the receiver, which means that heat must pass through the receiver to reach the toner. As a result, depending upon the receiver used, the process speed, and the ambient temperature, at times too much heat will pass through the receiver and it will melt the toner, while at other times insufficient heat will pass through the receiver and the toner will not transfer well. Thus, while the backup roller can be heated if desired, it is preferable to use an unheated backup roller.

It has been found that pressure aids in the transfer of the toner to the receiver, and an average nip pressure of about 135 to about 1000 kPa is preferred. Lower pressures may result in less toner being transferred and higher pressures may damage the element and can cause slippage between the element and the receiver, thereby degrading the image. In any case, the toner must not be fixed during transfer but must be fixed instead at a separate location that is not in contact with the element. In this way, the element is not exposed to high temperatures and the toner is not fused to the element. Also, the use of the lower temperatures during transfer means that the transfer process can be much faster, 6 meters/minute or more being feasible. Either halftone or continuous tone images can be transferred with equal facility using the process of this invention. Because the electrostatic image on the substrate is not significantly disturbed during transfer it is possible to make multiple copies from a single imagewise exposure.

The process of this invention is also applicable to the formation of color copies. If a color copy is to be made, successive latent electrostatic images are formed on the substrate, each representing a different color, and each image is developed with a toner of a different color and is transferred to a receiver. Typically, but not necessarily, the images will correspond to each of the three primary colors, and black as a fourth color if desired. After each image has been transferred to the receiver, it can be fixed on the receiver, although it is preferable to fix all of the transferred images together in a single step. For example, light reflected from a color photograph to be copied can be passed through a filter before impinging on a charged photoconductor so that the latent electrostatic image on the photoconductor corresponds to the presence of yellow in the photograph. That latent image can be developed with a yellow toner and the developed image can be transferred to a receiver. Light reflected from the photograph can then be passed through another filter to form a latent electrostatic image on the photoconductor which corresponds to the presence of magenta in the photograph, and that latent image can then be developed with a magenta toner which can be transferred to the same receiver. The process can be repeated for cyan (and black, if desired) and then all of the toners on the receiver can be fixed in a single step.

The following examples further illustrate the invention and provide a comparison with transfer and fixing of toner to a polymer-coated, paper receiver sheet.

EXAMPLE 1

A receiver sheet was prepared by coating a thermoplastic layer onto a microvoided polyester sheet. The matrix polymer of the microvoided sheet was poly(ethylene terephthalate) of 0.72 I.V. and 255° C. Tm. Uniformly dispersed in the matrix polymer were microbeads of silica-coated crosslinked polymer having diameters in the range from about 2 to 10 $\mu$m. The weight ratio of matrix polymer to microbeads was 85 to 15. The blend of matrix polyester and microbeads was extruded in the manner previously described to form a translucent film which then simultaneously tentered and drafted (biaxially oriented) approximately 3× in each direction, whereupon the film became white and opaque and had a thickness of 14 mils. After heat setting at about 200° C. for about 40 seconds while restraining the film against shrinkage, the film was cut into sheets approximately 15 by 60 cm. The sheets were then solvent coated with a thermoplastic polymer blend in methylene chloride consisting of "PLIOTONE 2015" polymer (a styrene butyl acrylate polymer supplied by Goodyear Chemical Co., weight average molecular weight ~70,000 and Tg=57° C.) and "PICCOTEX 100" polymer (an $\alpha$-methylstyrene-vinyltoluene copolymer supplied by Hercules, weight average molecular weight ~3,000 and Tg=54° C.) in a weight ratio of 70/30 to provide a thermoplastic layer of about 10 $\mu$m dry thickness. The resulting receiver sheet consisting of the microvoided substrate sheet and the transparent thermoplastic receiver layer had a total thickness of about 350 $\mu$m. The receiver sheet was then used for receiving a electrophotographic step tablet image pattern of cyan-colored thermoplastic dry toner. The image, which was a continuous tone image of large area, had been developed on an organic photoconductor in a magnetic brush developer station and transferred from the polyconductor to the receiver sheet by thermally assisted transfer wherein the receiver surface was preheated to 120° C. and immediately pressed into contact with the photoconductor at about 30 lb per linear inch by means of a chromium plated roller, the receiver sheet passing through the nip formed by the roller and drum at 2.5 cm per second. After the transfer the receiver sheet was passed through the roller nip of a fusing station where the toner was fixed to the receiver at a temperature of about 120° C. at 0.5 cm/sec. The toner, which comprised a styrene-butyl acrylate binder resin, a cyan pigment and a charge control agent and had an average particle size of about 3.5 microns, transferred well to the receiver sheet. The density scales of the step tablet to which the photoconductor had been exposed were accurately reproduced in the fixed image. No blisters or layer damage occurred. The test demonstrated that thermally assisted transfer of a small particle toner to a polymer coated substrate can be accomplished without blisters and without otherwise damaging the receiver or the equipment.

EXAMPLE 2

The procedure of Example 1 was repeated with the same type of receiver sheet in accordance with the invention and with the same kind of toner except that the transfer temperature was 125° C. Again the transfer was successful and no blistering or damage to the receiver sheet or equipment occurred. The example demonstrates that with the receiver sheet of the invention transfer can take place at a higher temperature than was previously found suitable for thermally assisted transfer.

COMPARATIVE EXAMPLES A AND B

Two receiver sheets were prepared as in Examples 1 and 2 except that the substrate for the receiver sheet was a high quality 9 mil, paper coated with polypropylene on its backside, of the type used as photographic paper supports. These receiver sheets were tested for toner transfer as in Examples 1 and 2. Although the toner transferred well, serious defects were observed in both the 120° and 125° C. transfers. In the 120° test the polypropylene coating on the backside of the resin-coated paper melted and formed an unsightly rough area on the back of the print. In the 125° test a large blister (approximately 125 mm×25 mm) formed on back of the paper substrate and this was also visible on the image side of the receiver, thus forming a serious defect in the image.

It should be noted that under the particular conditions of Examples 1 and 2, maximum transfer efficient was not achieved. However, these were laboratory hand coatings. Also, it is believed that because of the thickness of the receiver (14 mils) the receiving surface did not reach the optimum transfer temperature. This can be corrected by using a thinner substrate or a higher transfer temperature. The important observation is that image defects of blistering, delamination and the like did not occur in the examples of the invention but did in the Comparative Examples in which the receiver was resin-coated paper.

As indicated, the receiver sheet of the invention is especially beneficial for thermally assisted transfer and the image transfer method of the invention provides its greatest advantages in thermally assisted transfer of small toner particles. It should be understood, however, as previously explained, that the transfer method of the invention also includes electrostatic transfer of toner images having large continuous areas of toner of large particle size.

The invention has been described in detail with particular reference to preferred embodiments thereof, but it will be understood that variations and modifications can be effected within the spirit and scope of the invention.

We claim:

1. A receiver sheet for toner images which comprises
   (a) a non-fibrous but paper-like, microvoided polymeric sheet which is substantially opaque and highly reflective to visible light and which comprises a continuous matrix of oriented and heat set thermoplastic polymer having dispersed therein microbeads of polymer surrounded by void spaces, and (b) bonded to at least one surface of sheet (a) a layer of thermoplastic polymer having a glass transition temperature below the melting temperature of the polymer matrix of sheet (a).

2. A receiver sheet according to claim 1 wherein the thermoplastic polymer of layer (b) is a blend of polymers.

3. A receiver sheet according to claim 2 wherein one component of the blend of polymers has a molecular weight less than 10,000.

4. A receiver sheet according to claim 1 wherein the polymer of layer (b) is a blend of a styrene-butyl acrylate copolymer and an α-methylstyrene-vinyltoluene copolymer and the matrix polymer is biaxially oriented.

5. A receiver sheet according to claim 1 wherein the matrix polymer of the microvoided sheet (a) is a biaxially oriented polyester or polypropylene and the microbeads are formed of a cross-linked polymer and are coated with a slip agent.

6. A receiver sheet according to claim 5 wherein the matrix polymer is a poly(ethylene terephthalate) and the cross-linked polymer microbeads are coated with silica or alumina.

7. A receiver sheet according to claim 1 wherein the matrix polymer is a biaxially oriented polyester and the microbeads are of cellulose acetate.

8. A method of forming a receiver sheet adapted for the transfer thereto of thermoplastic electrostatic toner powder which comprises forming a blend of a major amount of a molten thermoplastic matrix polymer and of a minor amount of cavitating microbeads of a polymer which is incompatible with the matrix polymer, coextruding the blend of molten matrix polymer and microbeads with a molten homogeneous polymer of lower glass transition temperature lower than the melting temperature of the matrix polymer, recovering a coextruded laminated sheet comprising a layer of the matrix polymer and uniformly dispersed microbeads bonded to a layer of the homogeneous polymer, and orienting the laminated sheet to create in the matrix polymer layer light-scattering voids surrounding each microbead, the resulting laminated sheet having a smooth surface of low glass transition temperature for receiving toner particles and, by virtue of the voids in the matrix polymer, being substantially opaque and highly light reflective.

9. A method according to claim 8 wherein the laminated sheet is biaxially oriented and wherein the layer of homogeneous polymer has a thickness of about 5 to 20 micrometers.

10. A method according to claim 9 wherein the homogeneous polymer is a blend of polymers.

11. A method according to claim 10 wherein one component of the blend of polymers has a molecular weight less than 10,000.

12. A method according to claim 9 wherein the homogeneous polymer has a Tg of about 40° to 80° C. and a surface energy of about 40 to 60 dynes/centimeter.

13. A method according to claim 11 wherein the homogeneous polymer is a blend of a styrene-butyl acrylate copolymer and an α-methylstyrene-vinyltoluene copolymer.

14. A method according to claim 9 wherein the matrix polymer is a polyester or polypropylene and the microbeads are formed of a cross-linked polymer and are coated with a slip agent.

15. A method according to claim 9 wherein the matrix polymer is a polyester and the microbeads are of cellulose acetate.

16. A method of forming on a light reflecting receiver sheet a developed toner image having large, substantially continuous areas of toner which comprises forming a latent electrostatic image on an element, developing the image by applying a thermoplastic toner particles to the latent image on the element, transferring the toner particles of the developed image including large continuous areas of toner, to a receiver sheet by contacting the sheet with the element, and fusing and fixing the toner particles to the receiver sheet by pressing the transferred toner on the receiver sheet at a temperature above about 110° C.

said receiver sheet comprising a non-fibrous but paper-like, microvoided, polymeric sheet which is substantially opaque and is highly reflective to visible light and which comprises a continuous matrix of oriented thermoplastic polymer having dispersed therein microbeads of a different polymer each of which is surrounded by a void space.

17. A method according to claim 16 wherein the toner particles are transferred electrostatically to the receiver sheet.

18. A method according to claim 16 wherein the toner particles are transferred non-electrostatically by thermally assisted transfer to the receiver sheet.

19. A method according to claim 18 wherein the microvoided polymeric sheet of the receiver sheet is a substrate to which is bonded a layer of thermoplastic polymer having a Tg below the melting temperature of the matrix polymer and less than 10° C. above that of the thermoplastic toner particles.

* * * * *